Patented Mar. 26, 1946

2,397,212

UNITED STATES PATENT OFFICE 2,397,212

PROCESS OF PRODUCING TOCOPHEROL-LIKE COMPOUNDS

Lee Irvin Smith, Minneapolis, Minn., assignor to Regents of the University of Minnesota, Minneapolis, Minn., a corporation of Minnesota No Drawing. Original application July 14, 1939, Serial No. 284,456. Divided and this application January 7, 1943, Serial No. 471,611

16 Claims. (Cl. 260—333)

The present invention relates to methods of making parahydroxy coumarans and chromans, and more particularly to methods of making compounds related to the tocopherols.

The invention also relates to the manufacture of intermediates which are useful in the production of such compounds and separately useful as dyes, medicants and for other purposes.

Heretofore, such parahydroxy chromans and coumarans have been prepared by the reaction of hydroquinone compounds, such as alkyl poly substituted hydroquinone, with dienes or with allylic halides. Where the hydroquinone compound of such synthesis has all positions substituted except one position ortho to the hydroxyl group, the resultant tocopherol-like compounds are obtained in high yields of great purity, but where the hydroquinone compound is unsubstituted or has more than one vacant position, various side reaction products are obtained which are undesirable.

According to the present invention, para hydroxy chromans and coumarans may be prepared from para unsubstituted chromans and coumarans derived from phenolic compounds by the introduction of a hydroxyl radical para to the bridge oxygen, and it is therefore an object of the present invention so to prepare such compounds by such methods.

Specifically, an object is to provide procedures for introducing a hydroxyl radical para to the bridge oxygen of para unsubstituted chromans or coumarans by utilizing diazotized aromatic compounds, nitration procedures, or halogenation procedures.

It is an alternative object of the invention to provide a method of preparing para hydroxy coumarans or chromans by carrying out a series of steps upon ortho allylic phenols, such steps being carried out in any desired order. The steps include (1) coupling an ortho allylic phenol having the para position vacant, with an aromatic diazonium salt, (2) cyclization; and (3) conversion into the corresponding para hydroxy coumarans or chromans, and it is therefore an object of the invention to provide reactions for the said phenols including such steps in any desired order.

It is a further object of the invention to provide methods of making intermediate compounds from para unsubstituted chromans and coumarans and either aromatic diazonium compounds, and nitrogen containing compounds and bromo compounds, and to provide such new intermediate compounds.

It is a further object of the invention to provide a method of making new and useful compounds from the metallic salts of substituted phenols having the para position vacant and carbon dioxide, and to provide such new compounds.

It is also an object of the invention to utilize the herein disclosed procedures and all obvious variations, extensions and modifications thereof for the preparation of the types of compounds herein referred to.

It is also an object of the invention to utilize any known or hereinafter discovered effects of the described processes and products.

Other and further objects will be apparent and implied from the invention described and claimed herein.

In making para hydroxy chromans and coumarans in accordance with the present invention, the starting material utilized may be any para unsubstituted chroman or coumaran, such as those derived from the phenols. As representatives of these, reference is made to compounds such as 2,2,5,7,8-penta-methyl chroman or 2,-4,6,7-tetra methyl coumaran. Using the para-unsubstituted chroman or coumaran starting material, the introduction of the para hydroxyl is accomplished by the following procedure.

The para unsubstituted chroman or coumaran is first treated with an aromatic diazonium compound such as diazotized sulfanilic acid or diazotized para nitro aniline, to produce an intermediate azo dye compound of the invention. This is followed by a reductive cleavage of the resultant azo dye primary intermediate, which leads to the para amino chroman or coumaran, which may be considered as secondary intermediate. The final step consists in the replacement of the amino group by a hydroxyl group.

According to another of such procedures the para unsubstituted chroman or coumaran is nitrated in the para position by any of the usual nitration procedures such as by simultaneous treatment with sulfuric and nitric acid, or by the combined reaction with potassium nitrate and sulfuric acid. In any of these nitration procedures, the compound undergoing nitration is subjected to nitric acid or a derivative thereof which gives nitric acid in the reaction. The resulting para nitro chroman or coumaran is then reduced to the corresponding amine by any of the well known methods of reducing nitro compounds to amines. This results in the formation of useful nitrogen-containing chroman (or coumaran) intermediates. The para amino chroman or coumaran intermediate is then converted to the corresponding para hydroxy compound.

According to a third such method the para unsubstituted chroman or coumaran is halogenated by the use of a brominating or chlorinating agent to form the corresponding para halo-chroman (or coumaran). The halogen may be converted to a hydroxyl radical by the Grignard method, or by direct hydrolysis by an alkaline solution, such as sodium, potassium, calcium or other hydroxides or carbonates or the like, under atmospheric or super atmospheric pressure. Thus, the para halo-chroman (or coumaran) may be converted into a Grignard reagent by action of metallic magnesium in ethyl ether. The Grignard reagent is then oxidized to the halo-magnesium derivative intermediate of the para hydroxy chroman or coumaran and this is in turn converted into the corresponding para hydroxy chroman or coumaran.

As an alternative to the above methods, the diazo coupling or nitration or halogenation may be caused to take place with the formation of the corresponding ortho allylic phenol intermediate which is then cyclized, and the resulting para-azo chroman (or coumaran) or para nitro chroman (or coumaran) or para halo chroman (or coumaran) treated as indicated above to give the corresponding para hydroxy compounds, or as a further alternative the para-azo or para nitro groups or para halo groups may be replaced by hydroxy groups and the cyclization caused to take place as the last step.

According to another procedure of the present invention desirable new compounds which are useful for many purposes such as intermediates may be produced by reacting the metallic salts of substituted phenols with carbon dioxide under pressure to form the metallic salts of substituted para hydroxy benzoic acids. Thus the sodium salt of 3,5-dimethyl phenol may be reacted with carbon dioxide under pressure to produce the sodium salt of 2,6-dimethyl, 4 hydroxy benzoic acid, which is useful as such due to its stability and crystalline condition and also as an intermediate in various syntheses.

As illustrations of the above procedures several examples are given below, but these must not be understood to be limitations upon the general method and procedures herein desired and claimed.

Example I

Two and five-tenths grams of 2,4-dinitro aniline is diazotized by dissolving in 15 cc. of hot glacial acetic acid 1.5 cc. of concentrated sulphuric acid. The solution is then thoroughly cooled and 1 gram of sodium nitrite added in small amounts with stirring. An additional 5 cc. of glacial acetic acid is then added to facilitate stirring. The mixture is then admixed with 30 cc. of ethyl ether and decanted for purification. The thus partially purified diazotized dinitro aniline is then twice redissolved in acetic acid and precipitated for further purification and is finally dissolved in 15 cc. of acetic acid and added to a solution of 2,2,5,8-tetramethyl 6-unsubstituted chroman derived from 2,5-dimethyl phenol, in 5 cc. of acetic acid. The mixture is allowed to stand for 18 hours, during which time a coupling product precipitates which dissolves in ethyl acetate and crystallizes therefrom. The precipitate is obtained in 130 mg. yield, and has a melting point of about 169°–170° C. This compound is useful not only for the production of chroman compounds as herein set forth but also as a dye and dye intermediate.

Example II

A solution is prepared by dissolving 1.25 grams of 2,4,6,7-tetramethyl coumaran (0.01 mol.) in 20 cc. of glacial acetic acid. A second solution is prepared by dissolving 2.5 grams of 2,4-dinitro-aniline and 1.5 cc. of cencentrated sulphuric acid in 15 cc. of hot glacial acetic acid. The second solution is cooled to 20° C. in an ice bath and 4 cc. of butyl nitrite are added in 2 cc. portions with continuous shaking. After a few minutes all of the solid material of the second solution is dissolved, and yellow color is produced therein. Ethyl ether (20 cc.) is then added to the second solution and the diazonium salt which is present in the solution is thereby precipitated by a viscous oil and is separated by decanting off the top layer of the reaction medium. The thus separated viscous oily diazonium salt is again dissolved in 8 cc. of glacial acetic acid and precipitated with 20 cc. of ether and the oily salt product again separated by decanting off the supernatant layer. The first solution is then admixed with the viscous oily diazonium salt and a bright red intermediate product of the present invention precipitates and is separated. The yield is 3.03 grams and the melting point of the product is about 174°–176° C. before purification.

Example III

Two cubic centimeters of bromine in 10 cc. carbon tetrachloride are added to 5 grams of 2,2,5,7,8-pentamethyl chroman in 10 cc. of carbon tetrachloride. Hydrobromic acid is evolved for a period of twenty to thirty minutes, after which period the excess bromine is removed by shaking with a little aqueous sodium bisulfite, and ethyl ether is added and the ether-carbon tetrachloride layer is removed. The solvents are pumped off and the solid residue (6.2 grams) is purified by crystallization from dilute ethyl alcohol several times and melts at about 69°–70° C.

Four grams of the thus formed 2,2,5,7,8-pentamethyl-6-bromo chroman and 1.54 grams ethyl bromide in 12 cc. of ether are dropped slowly into 688 mg. magnesium, the period of dropping being approximately 1 hour. After disappearance of any further visible reaction, the mixture is refluxed for an hour and tank oxygen is then bubbled through the reaction mass for two hours. Iced hydrochloric acid is added and the mixture is thoroughly extracted with ethyl ether. The ether is removed under vacuum leaving a residual oil which could not be crystallized. The residual oil is taken up with petroleum ether and thoroughly extracted with Claisen alkali. The alkaline extract is diluted with water, acidified with hydrochloric acid and extracted with ethyl ether. Removal of the ether leaves an oil which deposits crystals when its solution in dilute ethyl alcohol is cooled. The thus separated crystalline solid is removed and recrystallized from petroleum ether. It forms large white crystals which weigh 250 mg. and have a melting point of about 94°–94.5° C. alone and when mixed with an authentic specimen of 2,2,5,7,8 - pentamethyl - 6 - hydroxychroman.

Example IV 2,3,5-trimethyl-6-allyl phenol, 1.73 grams, are dissolved in 7.9 cc. of 10% sodium hydroxide. To this is added 2.07 grams of diazotized sulfanilic acid prepared as in Example I, and a mixture which thereupon became dark red, is allowed to stand at room temperature for approximately two hours. To the solution there is then added about 4.53 grams of sodium hydro-sulphite and the entire mixture is heated, with stirring until it reaches 90° C., whereupon it becomes colorless. Upon cooling, a light yellow, needle, crystalline product separated and is recovered by filtration, 1.7 grams of the crystalline intermediate product being obtained.

To the separated crystalline product thus obtained there is added an oxidizing solution consisting of 5.5 grams of ferric chloride hexahydrate in 5 cc. of water and 2 cc. of concentrated hydrochloric acid. Steam is then passed through the mixture, whereupon the quinone compound, which is a liquid, is driven off and is recovered from the steam distillate by extraction with ethyl ether, 1.43 grams of 2,3,5-trimethyl-6-allyl quinone being obtained.

1.43 grams of the thus produced 2,3,5-trimethyl-6 allyl quinone is converted to 2,3,5-trimethyl-6-allyl hydroquinone by treatment with an excess of zinc in a mixture of 10 grams glacial acetic acid and 3 cc. of water. The mixture of quinone, zinc, acetic acid and water is heated under reflux for 15 minutes and the hydroquinone compound recovered by pouring the refluxed mixture into ice and water, the hydroquinone compound separating in the form of white needle-like crystals. The yield of trimethyl allyl hydroquinone thus formed is 1.16 grams.

The intermediate trimethyl allyl hydroquinone thus produced is cyclized to 2,4,6,7-tetramethyl-5-hydroxy coumaran by the following procedure:

One gram of trimethyl allyl hydroquinone and 2 grams pyridinium chloride are heated to a temperature of 205° C. for one hour. The reaction mixture is then dissolved in ethyl ether, the other solution washed with dilute sulphuric acid, and the other layer steam-distilled. The 2,4,6,7-tetramethyl-5-hydroxy coumaran distills over and crystallizes out as white needles, the yield being 620 mg. and the melting point being about 129°–130° C.

It will be noted that the foregoing procedures involve in general the steps of (1) introducing a substituent para to the oxygen and (2) replacement of this substituent by a hydroxyl group in one or more operations. In addition, such of the foregoing procedures as involve the ortho allylic phenols include as a third step (3) cyclization to form the chromans or coumarans. The order in which these steps are carried out is not material, thus providing several alternative routes to the final para hydroxy chromans and coumarans. The choice of the route taken depends upon the physical properties of the intermediates involved and particularly the yields in each of the steps, and may be widely varied to accommodate the specific materials being operated upon. Thus, the order of the steps may be any order desired with the exception that the Grignard procedure is a procedure such as that in Example III and cannot be applied while the hydroxyl group is present.

These and other obvious variations may be made in any of the procedures herein described and will be understood to be within the purview of the claimed invention.

This application is a division of my application Serial No. 284,456 filed July 14, 1939, now Patent No. 2,331,849 issued October 12, 1943.

I claim:

1. The process which comprises subjecting a chroman having an unsubstituted position para to the bridge oxygen to the action of a halogenating agent to form the corresponding para-halogen compound.

2. The process which comprises subjecting a para unsubstituted coumaran to the action of the halogenating agent to form the corresponding para-halogen compound.

3. The process which comprises subjecting a chroman having an unsubstituted position para to the bridge oxygen to the action of a chlorinating agent in a solvent to form the corresponding para-chloro compound.

4. The process which comprises subjecting a para unsubstituted coumaran to the action of a brominating agent in a solvent to form the corresponding para-bromo compound.

5. A process of producing a para hydroxy chroman which comprises converting the product of the process set forth in claim 1 into a Grignard reagent at the halogen substituent and then oxidizing said reagent.

6. A process of producing a para hydroxy coumaran which comprises converting to a hydroxyl group, the halogen group of the product of the process set forth in claim 2.

7. A process of producing a para hydroxy chroman which comprises hydrolyzing the product of the process of claim 1 with an alkaline reagent.

8. A process of producing a para hydroxy coumaran which comprises hydrolyzing the product of the process of claim 2 with an alkaline reagent.

9. The process of producing tocopherol-like compounds which comprises reacting a compound selected from the group consisting of para-unsubstituted chromans and coumarans to form the corresponding para-halo compound and replacing the para-halogen substituent of said group with a hydroxyl group to form the corresponding para-hydroxy tocopherol-like compound.

10. The process of producing tocopherol-like compounds which comprises reacting a compound selected from the group consisting of para-unsubstituted chromans and coumarans, to form the corresponding para-halo compound, converting said compound to a Grignard reagent and then oxidizing and hydrolyzing the so-formed Grignard reagent to liberate the corresponding para-hydroxy tocopherol-like compound.

11. The process of producing tocopherol-like compounds which comprises reacting a compound selected from the group consisting of para-unsubstituted chromans and coumarans, to form the corresponding para-halo compound, reacting said para halogen compound with a base and then recovering the so-formed para-hydroxy tocopherol-like compound.

12. The process of producing tocopherol-like compounds which comprises reacting a poly-alkyl para-unsubstituted chroman with a halogenating agent to form the corresponding para-halo chroman, and then replacing said para-halogen with a hydroxyl group to form the corresponding para-hydroxy tocopherol-like compound.

13. The process of producing tocopherol-like compounds which comprises reacting a poly-alkyl para-unsubstituted chroman with a brominating agent to form the corresponding para-bromo chroman, converting the so-formed para-bromo chroman into a Grignard reagent, reducing and oxidizing said reagent to yield the corresponding para-hydroxy tocopherol-like compound.

14. The process of producing tocopherol-like compounds which comprises reacting a poly-alkyl para-unsubstituted chroman with a halogenating agent to form the corresponding para-halo chroman, reacting the resultant para-halo chroman with a base and recovering the so-formed para-hydroxy tocopherol-like compound.

15. The process of producing 2,2,5,7,8-pentamethyl-6-hydroxychroman which comprises reacting a solution of 2,2,5,7,8-pentamethyl chroman in carbon tetrachloride with bromine to introduce bromine into the 6 position, recovering and purifying the resultant bromochroman by crystallization from ethyl alcohol, reacting the purified bromochroman with ethyl bromide and magnesium under conditions productive of a Grignard of the bromochroman, oxidizing said Grignard to the bromo-magnesium derivative intermediate of the p-hydroxychroman and then converting said derivative to the 2,2,5,7,8-pentamethyl-6-hydroxychroman.

16. The process of producing 2,2,5,7,8-pentamethyl-6-hydroxychroman which comprises brominating 2,2,5,7,8-pentamethyl chroman to introduce a bromo group in the 6 position, and then converting the bromo chroman thus formed into 2,2,5,7,8-pentamethyl-6-hydroxychroman.

LEE IRVIN SMITH.